United States Patent [19]
Fuchs

[11] Patent Number: 4,540,423
[45] Date of Patent: Sep. 10, 1985

[54] METHODS OF FASHIONING GLASS BONDED DEVICE

[75] Inventor: Otto Fuchs, Westlake Village, Calif.

[73] Assignee: Burroughs Corporation, Detroit, Mich.

[21] Appl. No.: 531,557

[22] Filed: Oct. 17, 1983

Related U.S. Application Data

[62] Division of Ser. No. 299,095, Sep. 3, 1981.

[51] Int. Cl.³ .............................................. C03C 29/00
[52] U.S. Cl. ....................................... 65/18.1; 29/603
[58] Field of Search ........................... 65/18.1; 29/603; 269/254 R, 43, 157, 166

[56] References Cited

U.S. PATENT DOCUMENTS

| | | | |
|---|---|---|---|
| 2,869,433 | 1/1959 | Dery | 269/305 |
| 3,155,064 | 11/1964 | Gates | 269/224 |
| 3,296,436 | 1/1967 | Schneeman | 269/403 |
| 3,312,460 | 4/1967 | Kaufman | 269/43 |
| 3,610,837 | 10/1971 | Brede et al. | 29/603 |
| 3,951,395 | 4/1976 | Hennenfert | 269/266 |

*Primary Examiner*—William F. Smith
*Attorney, Agent, or Firm*—John J. McCormack; Nathan Cass; Kevin R. Peterson

[57] ABSTRACT

Described is a fixture for glass-bonding a digital magnetic recording slider workpiece (the component parts thereof), while holding them carefully aligned. In one preferred embodiment this fixture includes a slot for receiving a number of such work pieces in pre-assembled form registering and aligning them together and providing retainer means individually for each work piece adapted to resiliently and selectively engage each work piece and hold it positively in careful, precise alignment while glass-bonding and related operations carried out on the array of multiple work pieces so-aligned and retained.

11 Claims, 10 Drawing Figures

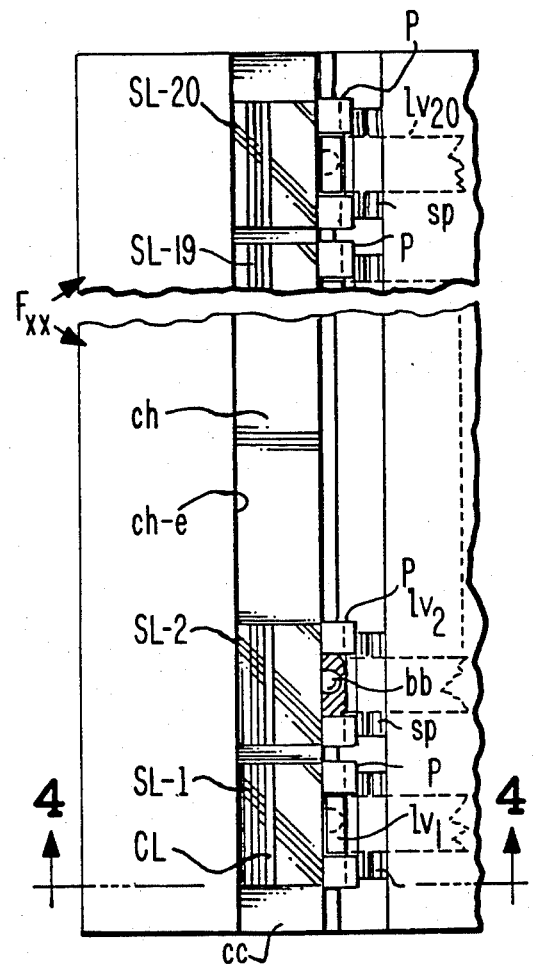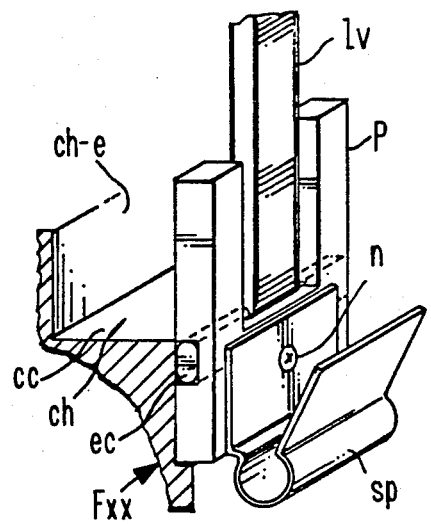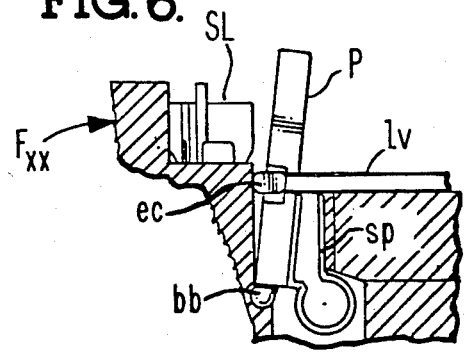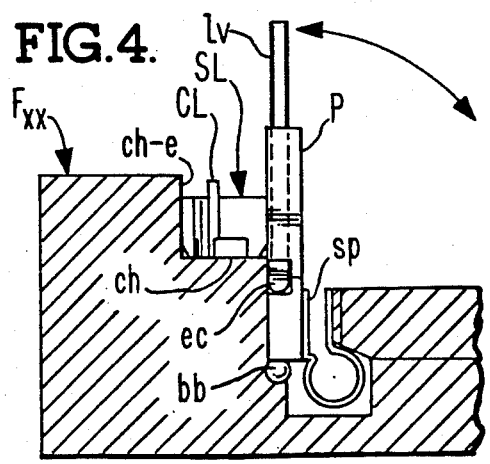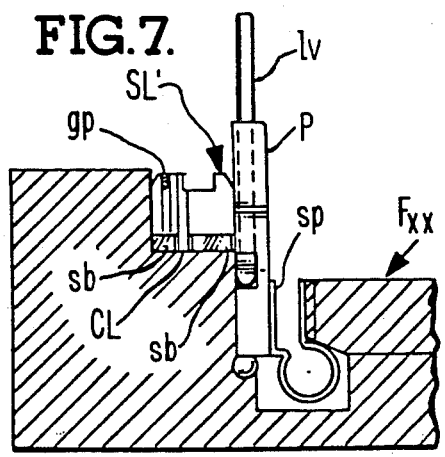

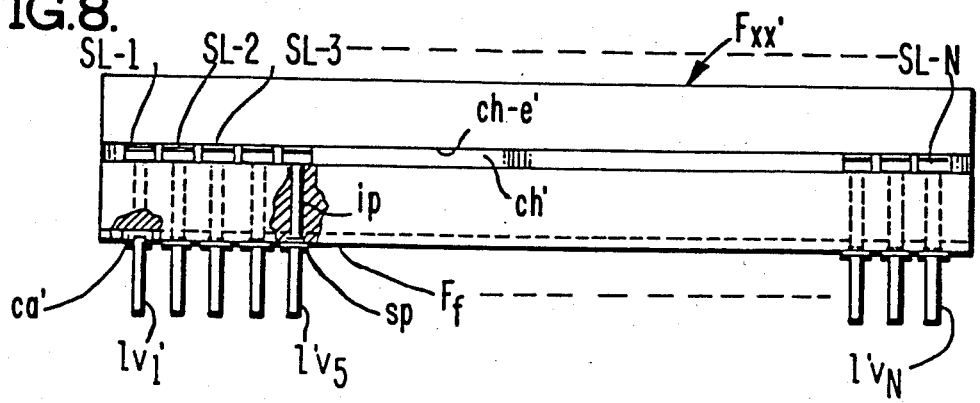

METHODS OF FASHIONING GLASS BONDED DEVICE

This is a division, of application Ser. No. 299,095 filed Sept. 3, 1981.

BACKGROUND, FEATURES OF INVENTION

This invention relates to magnetic recording structures and more particularly to methods and fixtures for fabrication thereof.

Workers in the art of making magnetic means will recognize the rather schematically shown magnetic recording slider SL in FIG. 1 as of a type adapted for high performance digital recording, e.g., with floppy disks. Workers understand that slider SL is made up of three magnetic core pieces, #2, 3 and 4 flanked by a pair of block elements #1, 5, these elements all being very carefully aligned with high precision and bonded together as shown in the art; the bond lines b being indicated. The so-formed slider will present a "top" transducing face as indicated and a "base" face from which project the well known coil tabs such as core leg. A plug gap gp is also filled with vitreous gap material as known in the art.

Workers have heretofore resorted to assembling and aligning such core pieces and then bonding them individually and using rather crude "holder means", if any. This invention is directed towards methods and associated fixtures for assembling and holding such slider elements as a batch (e.g., a group of 20 identical assemblies) and maintaining this alignment precisely while glass bonding all of the assemblies in a single sequence. Also the invention teaches a convenient fixture for effecting such batch-assembly, alignment and bonding, in a fixture allowing workers to so-handle any number of assemblies up to a maximum (e.g., 1 to 20 units in the embodiment illustrated).

BRIEF DESCRIPTION OF THE DRAWINGS

The foregoing and other features and advantages of the present invention will be appreciated by workers as they become better understood through reference to the following detailed description of preferred embodiments which should be considered in conjunction with the accompanying drawings, wherein like reference symbols denote like elements.

FIG. 2 is a plan view of a glass bonding fixture embodiment of the invention shown relatively schematically, with some parts omitted for clarity; while FIG. 3 is a partial plan view of a related fixture with some elements indicated in phantom for a "first bonding mode", portions thereof being indicated (with minor modification) in FIG. 4 in a "second bonding mode", with the retaining spring mechanism thereof being indicated functionally in FIG. 5;

FIGS. 6 and 7 illustrating this mechanism in upper part elevation and elevation respectively; and FIG. 8 is a plan view of another fixture embodiment; while

DESCRIPTION OF PREFERRED EMBODIMENTS

The following description of methods and associated fixtures is given by way of example to indicate preferred embodiment according to the invention. Except as otherwise specified, workers should assume that conventional related methods, conditions, materials, etc., obtain throughout, conforming to present good practice in the art.

Figure 1:
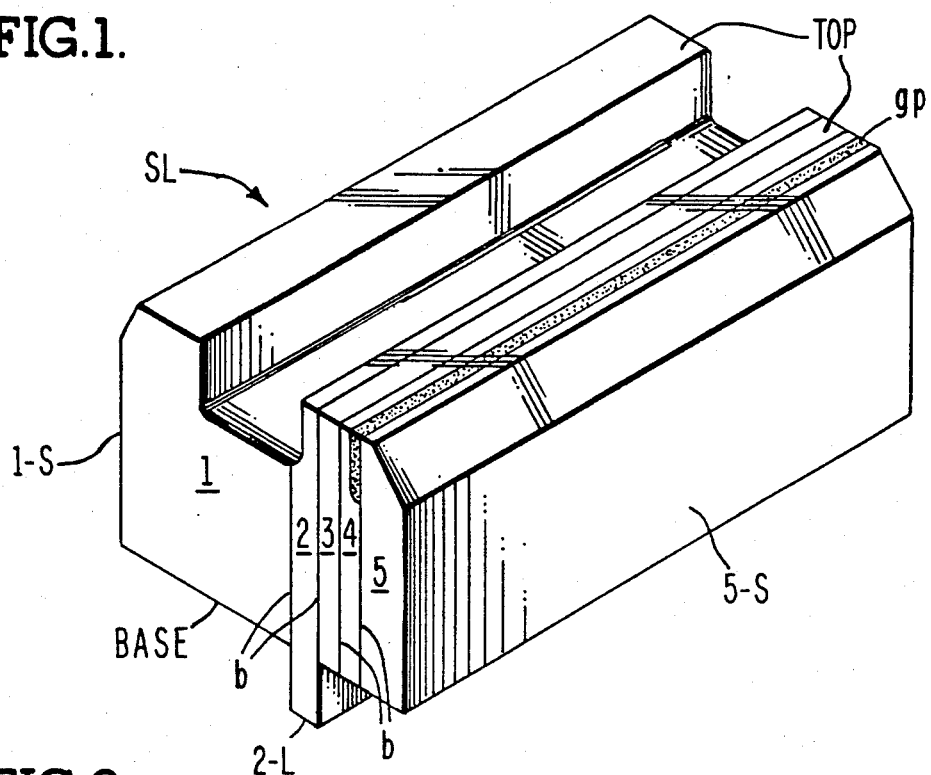
FIG. 1 is a schematic perspective of a slider workpiece for use with the invention.

Workers in the art of making magnetic recording slider devices are familiar with the slider subassembly SL shown schematically in FIG. 1. Assembly SL will be understood as comprising three relatively magnetic core slices 2, 3 and 4 shaped as indicated and adapted to be bonded to one another and to flanking block elements 1, 5 along prescribed precise bond lines indicated as b.

Novel glass bonding method:

Step #1: The slider subassembly will be understood as preassembled with its parts (e.g., the five parts indicated for SL in FIG. 1, for instance) prealigned and bonded temporarily as aligned. For instance, such a slider may be understood as including manganese-zinc-ferrite elements to be formed into a tunnel erase head such as used for high technology floppy disk recording as known in the art.

Such assemblies SL are preferably gathered together in a batch, e.g., 20 in a batch, with the top (recording) face pressed against a registration surface and the sides (5-S, 1-S) being compressed resiliently to hold the parts together in alignment during the glass bonding (heating) steps [which presumably may well release the temporary adhesive—it is very important that the parts be held in intimate contact and in very precise alignment with the bond lines b kept a prescribed uniform gap distance on the order of 0.10 of a mil].

Step #2: With the batch of units SL so registered against a reference surface and resiliently clamped in place at their sides, their base surfaces will be exposed upward; accordingly the glass bond material (frit) intended to comprise the bond lines b may be painted or otherwise applied to this base surface (unless the material has been previously applied along the bonding surfaces).

Step #3: The batch is now ready for heating to form the glass bonds at b, e.g., the batch of assemblies SL so fixed in a single glass bonding fixture may be inserted in a conventional glass bonding furnace, such as a belt furnace. This will act to loosen (and preferably remove) all temporary adhesive holding a unit aligned and to heat it sufficient to liquify and distribute the (glass frit) material along the bond lines b—each unit being held in prescise critical alignment, preferably by individual spring or other resilient means to assure that uniform thickness bond b will result.

Step #4: The batch of units SL may be cooled to harden the bonds along bond-lines b for a permanent bond, these bond lines may, according to this method be made very, very thin and thus of low mass so as to be relatively insensitive to terminal shock, according to a feature hereof. This allows the cooling period to be relatively brief, thus accelerating the overall bonding process.

Step #5: A second, "plug-bonding" sequence is next invoked, with the batch of units being flipped upside down with their core legs hanging down so that the plug-gap gp (FIG. 1) may be filled with bonding material as is well known in the art.

Step #6: Thus the batch of assemblies SL are reheated sufficient to melt-in a glass cane (or otherwise liquify plug material) for the plug gp in a conventional known manner. This is usually done by "sagging" a glass cane into the indicated slot on the air bearing (or "top" side) of assembly SL. This slot gp exists to accommodate step-grinding of the erase cores to an appropriate track width.

Figure 2:
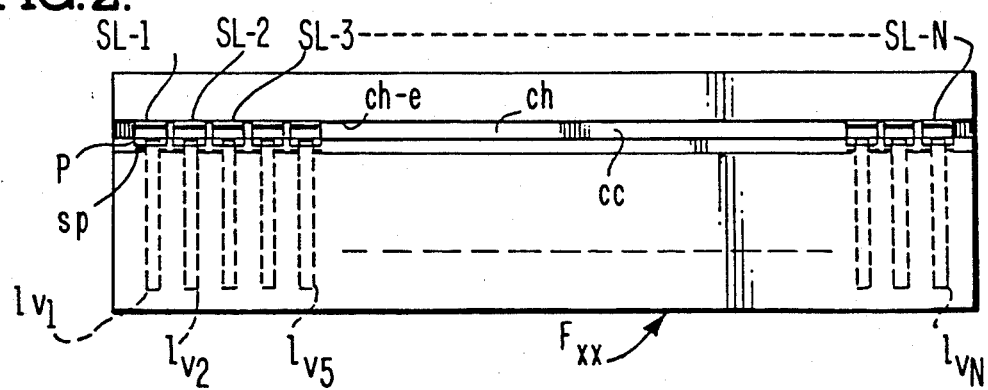
Figure 9:
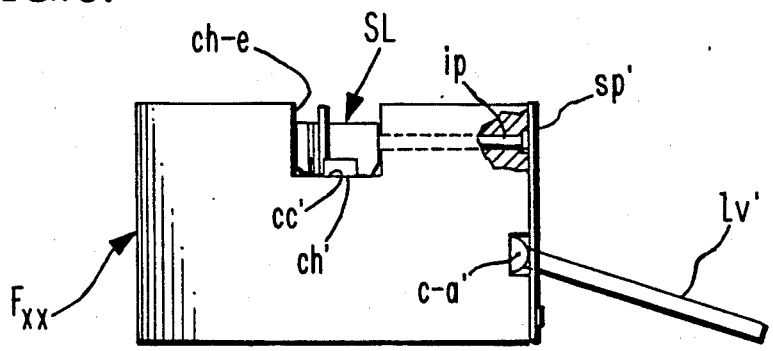
FIGS. 9 and 10 are respective elevation and perspective schematic views of the associated retainer spring mechanism.
Figure 10:
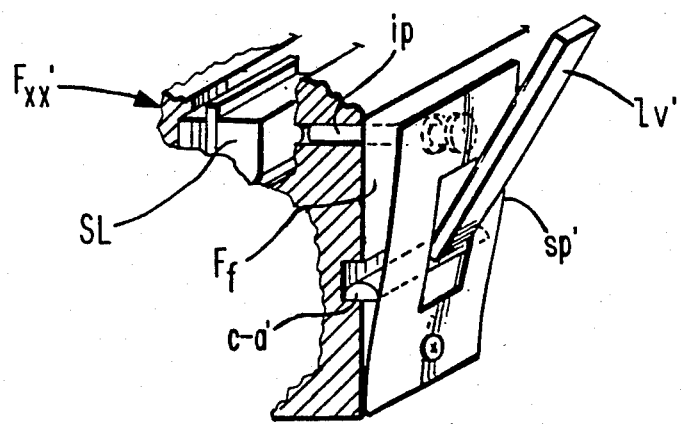

Novel glass bonding fixture; FIGS. 2-7:

Glass bonding methods like the foregoing are preferably implemented using a novel glass bonding fixture such as fixture $F_{xx}$ shown in FIG. 2 and described as follows (or alternatively with fixture $F'_{xx}$ in FIGS. 8-10 mentioned below).

Fixture $F_{xx}$ comprises a block into which a channel ch is cut to have a flat, precisely oriented planar reference base cc and a reference edge ch-e orthogonal to cc (see related embodiment FIG. 3). Thus, as indicated in FIG. 2 a batch of identical assemblies SL (such as SL-1 to SL-20) may be inserted in channel ch with their top or recording faces contacting the registration base cc of channel ch, and with one side thereof referenced against registration edge ch-c, being urged thereagainst by resilient lockable spring means sp as indicated functionally in FIGS. 5-7 (alternative embodiment in FIGS. 9, 10). With assemblies SL aligned in a row in this condition and their bases exposed upward it will be seen as relatively simple to paint on or otherwise apply the glass (frit) bonding material intended to comprise the bond lines b.

According to a feature of novelty, each mentioned spring means comprises a forked plate P urged resiliently, and selectively, against its respective slider SL by an associated biased leaf-spring loop sp (see FIGS. 4-7). The "released" condition thereof is indicated functionally in FIG. 6 (compare "retained" condition in FIG. 4) whereby, with lever lv thrown downward an eccentric cam-axle ec is so rotated as to leave the spring/plate combination "released" and in contact with a slider SL (e.g., via interposer-rod—see $L_p$ in FIG. 9) to retain its parts carefully compressed in precise alignment. This spring pressure is very carefully metered and pre-adjusted (see nut n) to apply sufficient pressure to retain the slider with its parts kept aligned together, yet not so much as to risk cracking or damaging it (as an operator is conventionally prone to do using "guesswork").

By comparison in FIG. 4, lever lv is thrown toward the horizontal to rotate cam ec 90+° to the "parting condition" whereat it pushes the plate/spring unit away from its slider SL, allowing it to be removed, etc. To best accommodate this, plate P is pivoted from its base on ball-bearing bb, also being free to swivel a bit so its two tines b may be rotated to better align with the adjacent side (5-s, etc.) of its slider SL.

As best shown in FIGS. 6, 7, axle ec is seated in a receiving pocket cut across plate P with its lever Lv attached midway along ec to be swung in the space between the plates tines b. Spring sp preferably comprises a leaf-spring (e.g., preferably of Inconel X-750) folded into a re-entrant loop and captured and pressed against plate P by a nut n or like means for adjusting spring tension. Leaf spring sp is adapted to thrust plate P and slider SL toward registration edge ch-c (normally—except where "released" by urging of eccentric cam ec rotated by rotation of associated lever Lv), thereby securing the associated head SL against registration edge ch-c.

Once the first glass bonding sequence is completed as indicated in the above described method the assemblies may be inverted (flipped over) with their core legs CL depending. For this reason, and in order to use channel ch for the second glass bonding step as well, a pair of spacers or shoulder bars sb, sb' approximating the height of core legs CL are laid along registration surface cc on opposite sides of channel ch as indicated in FIG. 4. During this glass bonding step the springs sp will similarly urge the assembly SL against reference edge ch-e (but this may not be necessary since they are already bonded together).

Results:

Workers will perceive that this fixture, and any like it, is an advantageous implementation of the novel method previously described. For instance, one can co-bond a number (e.g., here up to 20) of slider assemblies simultaneously, whereas prior art techniques bond only one or two at a time. Similarly, the retaining spring means sp, etc., is adapted to maintain the parts in intimate contact along bond lines b during the glass bond heating when the temporary adhesive is released—whereas in the prior art no such spring means are used but only weights or a like slight, non-adjustable gravitational urging.

Also, such a structure including springs sp is designed to survive the harsh glass bonding environment (including the extremes of heat, atmosphere and corrosive glass chemistry and the like)—especially when Inconel X-750 springs are used. Further, it will be recognized as quite advantageous to use such a fuxture wherein one can turn from the first glass bonding step to the second merely by inserting spacers such as shoulder bars sb, sb'.

Second fixture embodiment; FIGS. 8-10:

Workers will visualize alternative fixtures to $F_{xx}$ above described implementing some or all of its novel features. One such is fixture $F'_{xx}$ in FIGS. 8-10, understood as essentially the same (at least functionally) as $F_{xx}$ above except as otherwise specified.

In FIG. 8 (a plain view like FIG. 2A, in plan view) fixture $F'_{xx}$ will be understood like $F_{xx}$ to include a slider-receiving channel ch' plus retainer means for individually securing each slider unit in channel ch' with its pieces held firmly aligned. This retainer means comprises a slotted leaf-spring SP' deflectable by a rotatable 2-position cam axle c-a' and biased against an interposer rod ip, which is to selectively pin its respective slider resiliently against opposing reference edge ch-e' when cam c-a' is rotated to "rest" condition (FIG. 9) but to release it when c-a' is rotated (FIG. 10). A lever Lv' is provided to so rotate c-a' and spring Sp' will be understood as centrally-slotted to allow lever connection and movement—the spring being attached to a sidewall ff of fixture $F'_{xx}$. Interposer rods Lp are depressed loosely in receiving bores in the fixture body to contact a respective slider in its exact center (of height and of length) to urge it against channel wall ch-e' with minimal "tilt" and are long enough to extend from a respective spring SP' to very slightly protrude into channel ch' in "rest" condition (FIG. 9). This allows them to be urged very slightly away from a slider as the slider is inserted, biasing spring SP' in the process. The fixture body may be made of "micronite" or like machinable refractory. As before all parts are designed to survive glass-bonding. As before, the fixture will be recognized as inherently "safer and gentler" for delicate slider assemblies, providing a constant, fairly precise retaining pressure to hold them firmly yet not crack them. The provision of such a two-position "cam-leaf spring" system assures this.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other forms of slider and like tiny assemblies destined for glass bonding or a like treatment—especially where each unit must be held resiliently in place with a prescribed constant, fairly-precise pressure. Also, the present invention is applicable for providing like fixtures for similar treatments of other unit-groups requiring delicate handling.

The above examples of possible variations of the present invention are merely illustrative. Accordingly, the present invention is to be considered as including all possible modifications and variations coming within the scope of the invention as defined by the appended claims.

What is claimed is:

1. An improved method for retaining an array of tiny fragile workpieces in a common fixture during processing where each workpiece must be held therein by a fairly precise constant retention pressure, the method comprising:

providing a workpiece-receiving channel in the fixture with a prescribed precision-oriented precisely flat registration surface along one side of the channel; and a precisely flat base surface orthogonal thereto;

disposing each workpiece at a respective site along the base surface of the fixture channel; said fixture having retainer means for each workpiece at its site in the form of contact means resiliently applicable against the workpiece by associated lever means to press it against the registration side of the channel;

clamping the workpieces in place with the contact means; conducting the treatment and releasing the workpieces for removal by actuation of the lever means.

2. The method of claim 1 where the workpiece is a magnetic recording slider assembly and the treatment is glass-bonding.

3. An improved method of fashioning and glass bonding a plurality of slider assemblies, comprising:

providing fixture means having a fixture slot means including a pair of orthogonal base and side surfaces which are precisely flat and carefully aligned;

the slot means being adapted to form N sites along the base, each for receiving a respective slider assembly;

also providing like retainer means for each site, being adapted to be selectively actuated into and out of resilient contact with the respective slider assembly;

disposing each assembly in a respective one of said slot sites and retaining it in place with said associated retainer means; and then performing at least a glass bonding step while retained in said slot.

4. The method as recited in claim 3 where each retainer means comprises spring means adapted to resiliently urge a respective slider assembly against the channel side surface with prescribed pressure and wherein selectively actuable displacement means are also provided, and operated to be selectively moved from a "rest" condition to an "actuate" condition whereby to displace the spring means into, or out of, contact with the concerned slider assembly.

5. The method as recited in claim 4 where the displacement means includes a rotatable cam-axle means, including a handle for accommodating manual rotation thereof.

6. The method as recited in claim 5 where each cam-axle is held in a pocket in the fixture and where the spring means includes a leaf-spring plus intermediate contact means disposed between the spring and the respective slider assembly.

7. The method as recited in claim 6 where the contact means is fashioned as an interposer rod.

8. The method as recited in claim 7 where the leaf spring is slotted to accommodate said handle.

9. The method as recited in claim 8 where the contact means is fashioned and used as a plate mounted to be pivoted by the spring against its slider assembly.

10. The method as recited in claim 9 where the plate is ball-bearing pivoted so as to be so pivotable in two dimensions.

11. The method as recited in claim 10 where the plate is slotted to accommodate said handle.

* * * * *

UNITED STATES PATENT AND TRADEMARK OFFICE
CERTIFICATE OF CORRECTION

PATENT NO. : 4,540,423

DATED : September 10, 1985

INVENTOR(S) : Otto Fuchs

It is certified that error appears in the above-identified patent and that said Letters Patent is hereby corrected as shown below:

Col. 1, line 21, change "shown" to --known--;
Col. 1, line 24, change "leg." to --leg 3-L.--.
Col. 2, line 58, after "may" insert --now--.
Col. 3, line 25, change "ch-c," to --ch-e,--.
Col. 4, line 33, change "fuxture" to --fixture--;
      line 42, change "plain" to --plan--;
      line 53, change "Sp'" to --SP'--;
      line 56, change "$F'_{xx}$." to --$F_{xx'}$.--.

Signed and Sealed this

Twenty-sixth Day of November 1985

[SEAL]

Attest:

Attesting Officer

DONALD J. QUIGG

Commissioner of Patents and Trademarks